(12) United States Patent  (10) Patent No.: US 6,469,694 B1
Mikan  (45) Date of Patent: Oct. 22, 2002

(54) MOUSE EMULATION KEYBOARD SYSTEM

(76) Inventor: Peter J. Mikan, 31 Greenfield Rd., Milford, CT (US) 06460

( * ) Notice: Subject to any disclaimer, the term of this patent is extended or adjusted under 35 U.S.C. 154(b) by 0 days.

(21) Appl. No.: 09/547,946

(22) Filed: Apr. 12, 2000

Related U.S. Application Data

(60) Provisional application No. 60/129,018, filed on Apr. 13, 1999.

(51) Int. Cl.[7] .................................................. G09G 5/00
(52) U.S. Cl. ........................................ 345/168; 345/157
(58) Field of Search ................................ 345/157, 160, 345/163, 168, 172

(56) References Cited

U.S. PATENT DOCUMENTS

| 5,021,638 | A | * | 6/1991 | Nopper et al. | 235/145 R |
| 5,189,403 | A | | 2/1993 | Franz et al. | 340/711 |
| 5,305,449 | A | | 4/1994 | Ulenas | 395/500 |
| 5,376,946 | A | | 12/1994 | Mikan | 345/157 |
| 5,568,987 | A | | 10/1996 | Franz | 400/490 |
| 5,577,848 | A | | 11/1996 | Bowen | 400/472 |
| 5,621,436 | A | | 4/1997 | Solhjell | 345/163 |
| 5,831,597 | A | | 11/1998 | West et al. | 345/163 |
| 5,835,791 | A | | 11/1998 | Goff et al. | 395/882 |
| 6,098,143 | A | * | 8/2000 | Humpherys et al. | 710/260 |
| 6,100,875 | A | * | 8/2000 | Goodman et al. | 345/163 |
| 6,281,812 | B1 | * | 8/2001 | Kim | 341/23 |
| 6,320,519 | B1 | * | 11/2001 | Hsu et al. | 341/23 |

* cited by examiner

*Primary Examiner*—Kent Chang
*Assistant Examiner*—Tom V. Sheng
(74) *Attorney, Agent, or Firm*—OURPAL® Asija

(57) ABSTRACT

The mouse emulation keyboard relates to improved methods, devices and system for electronic digital computer keyboards which has bifurcated plug compatible cable for mouse port and keyboard port. The arrow keys on the keyboard transparently emulate the functions of a pointing device such as a mouse. The keyboard is waterproof with silicone rubber cover without loss of tactile feedback and operability. The keyboard can be used for normal keyboard functions. Upon depressing a mouse mode key the arrows keys emulate the functions of a pointing device such as a mouse. Control, Windows and Alternate keys are made dual function to emulate left, middle and right mouse button functions.

3 Claims, 6 Drawing Sheets

MOUSE EMULATION KEYBOARD SYSTEM

RELATED DOCUMENT

Figure 1:
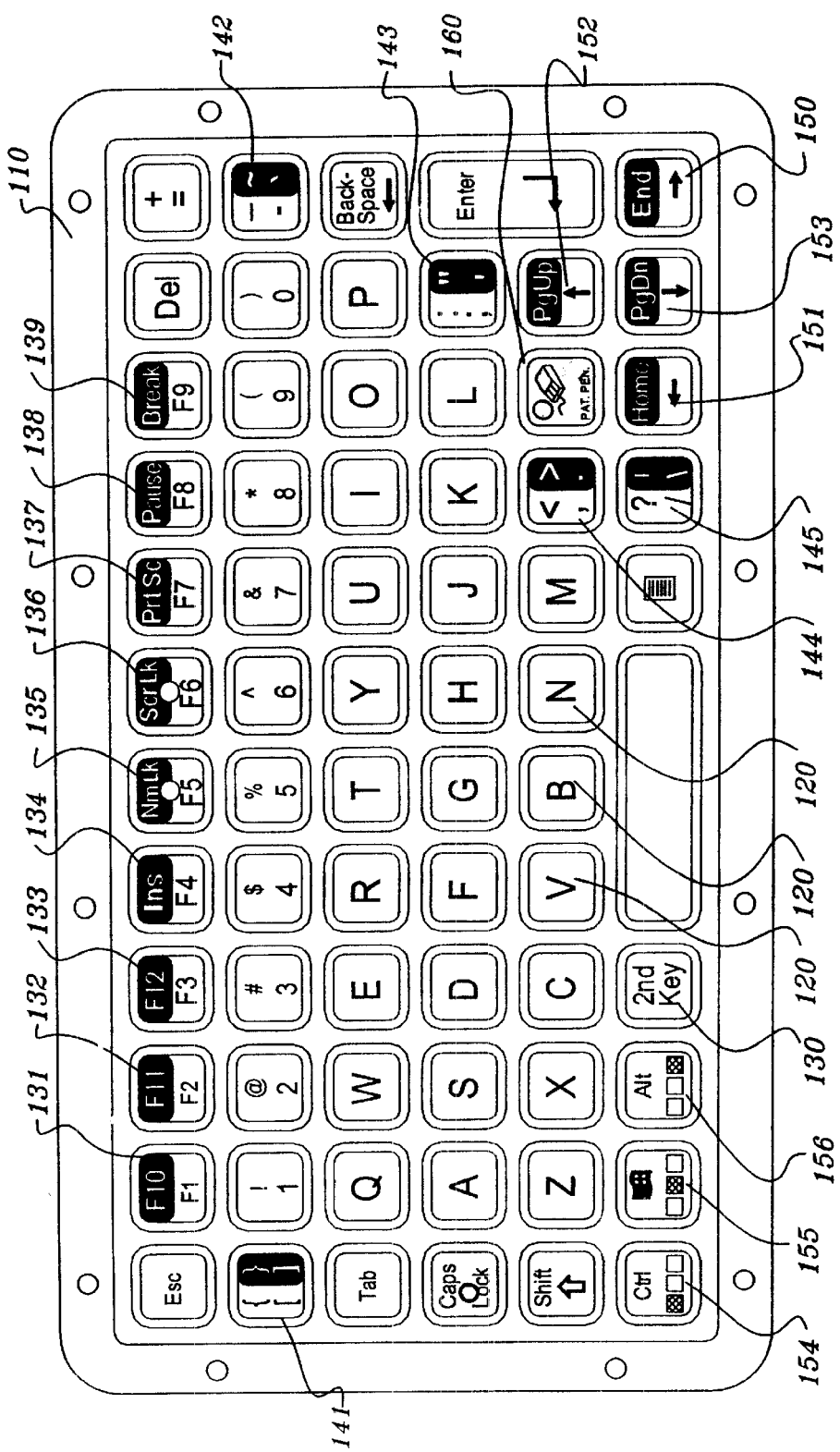

This application is based upon and continuation of Provisional application Serial No. 60/129,018 filed Apr. 13, 1999 titled, "Mouse Emulation Keyboard System" by the same inventor who claims priority therefrom.

BACKGROUND

This invention relates to improved methods, devices and system for electronic digital computer keyboards. More particularly it relates to a keyboard which transparently emulates the mouse function.

1. The Problem

Prior art electronic digital computers utilize separate keyboard and mouse, which plug into separate ports via separate cables. The problem with prior art mouse or other pointing device integrated dual function keyboards is that they simulate the mouse function on the keyboard by using the keyboard port. Some other prior are devices simulate the mouse function on the keyboard by software alone without any hardware emulation.

All of the prior art systems by software simulation or integrated hardware utilize the same keyboard port. Separate devices are not practical at shop/factory floors. Simulated devices are not functionally transparent to the computer because they are interfaced via the keyboard port only.

The applicant's invention solves this problem by incorporating a bifurcated keyboard cable such that normal keyboard functions are interfaced to the keyboard port and the normal mouse functions are interfaced to the mouse port notwithstanding both are being generated by the keyboard alone.

SUMMARY

A mouse emulation integrated keyboard system with bifurcated plug compatible cable for mouse port and keyboard port. The arrow keys on the keyboard transparently emulate the functions of a pointing device such as a mouse. The keyboard is waterproof with silicone rubber cover without loss of tactile feedback and operability. The keyboard can be used for normal keyboard functions. Upon depressing a mouse key (also known as arrow key or cursor key) the arrows emulate the functions of a pointing device such as a mouse.

2. Prior Art

A informal preliminary prior art patentability and novelty search was conducted. Furthermore the inventor is intimately familiar with the prior art. Following are examples of the prior art discovered in the search and/or known to the applicant/inventor and/or his patent agent/attorney.

The following prior art United States patents have been arranged in the reverse chronological order for ready reference of the reader.

a) U.S. Pat. No. 5,835,791 awarded to Goff et al on Nov. 10, 1998 for "Versatile Connection of a First Keyboard/Mouse Interface and a Second Keyboard/Mouse Interface to a Host Computer"

b) U.S. Pat. No. 5,831,597 granted to West et al on Nov. 3, 1998 for "Computer Input Device for Use in Conjunction with Mouse Input Device"

c) U.S. Pat. No. 5,621,436 bestowed upon Erik Solhjell of Norway on Apr. 15, 1997 for Keyboard with Integrated Mouse for Data Entry and Control"

d) U.S. Pat. No. 5,608,895 earned by Kwanho Lee of Korea on Mar. 4, 1997 for "Method for Providing Mouse Functionality Using Either an Internal or External Mouse Input Device"

e) U.S. Pat. No. 5,594,847 published in the name of Elizabeth Moursound on Jan. 14, 1997 for "System and Method for Selecting Free Form Objects Associated with a Selection Region Displayed by a Computer"

f) U.S. Pat. No. 5,590,315 blessed upon Hess et al on Dec. 31, 1996 for "Method and Apparatus for Simulating User Input Device Presence in a Computer System"

g) U.S. Pat. No. 5,577,848 bestowed upon James Bowen on Nov. 26, 1996 for "Light Controlled Touch Pad for Cursor and Selection Control on a Computer Display h) U.S. Pat. No. 5,568,987 honorably given to Patrick Franz on Oct. 29, 1996 for "Pointing Stick in a Computer Keyboard for Cursor Control"

i) U.S. Pat. No. 5,515,040 honorably presented to Lee et al on May 7, 1996 for "Method of Self-Calibration for a Key-Type Mouse"

j) U.S. Pat. No. 5,407,285 patented by Patrick Franz on Apr. 18, 1985 for "Pointing Stick in a Computer Keyboard for Cursor Control"

k) U.S. Pat. No. 5,376,946 awarded to Peter Mikan on Dec. 27, 1994 for "Computer Mouse Simulator Device"

l) U.S. Pat. No. 5,305,449 bestowed upon Jonas Ulenas on Apr. 19, 1994 for "Keyboard/Pointing Device Conversion Adapter which Converts Mouse Motion Signals into Cursor Signals by Activating Keyboard Cursor Keys"

m) U.S. Pat. No. 5,198,802 honored upon Bertram et al on Mar. 30, 1993 for "Combined Keyboard and Mouse Entry"

n) U.S. Pat. No. 5,189,403 earned by Franz et al on Feb. 23, 1993 for "Integrated Keyboard and Pointing Device System with Automatic Mode Change"

o) U.S. Pat. No. 5,124,689 given to Franz et al on Jun. 23, 1992 for "Integrated Keyboard and Pointing Device System"

p) U.S. Pat. No. 5,058,046 bestowed upon James Lapeyre on Oct. 15, 1991 for "Cursor Selected Keyboard Keys Displayed on the Computer Screen for Entering Alpha Numeric Characters and Instructions, particularly for Creating Computer Aided Design and Drafting Patterns"

q) U.S. Pat. No. 5,049,863 presented to Mayumi Oka of Japan on Sep. 17, 1991 for "Cursor Key Unit for a Computer Having a Mouse Function Removeably Mounted on a Keyboard Section of a Base"

r) U.S. Pat. No. 5,021,638 to Nopper et al on Jun. 4, 1991 for "keyboard Cover"

s) U.S. Pat. No. 4,917,516 honorably bestowed upon Dale Retter on Apr. 17, 1990 for "Combined Computer Keyboard and Mouse Data Entry System"

t) U.S. Pat. No. 4,882,581 blessed upon Inobe et al on Nov. 21, 1989 for "Keyboard for a Portable Data Terminal"

u) U.S. Pat. No. 4,868,549 published in the names of Affinito et al on Sep. 19, 1989 for "Feedback Mouse"

v) U.S. Pat. No. 4,775,574 earned by Fukushima et al of Japan on Oct. 4, 1988 for "Covering Member of a Keyboard and a Base Plate Therefor"

Unfortunately none of the prior art devices singly or even in combination provide all of the features and objectives established by the inventor for this system as enumerated below.

OBJECTIVES

1. It is an objective of this invention to provide method, devices and system for integrated mouse keyboard device such that the computer is fooled into believing that two separate devices are interfaced to it when in fact there is only one device connected to it via two separate ports.

2. Another objective of this invention is to emulate the mouse function on the keyboard by hardware as contrasted from simulation by software.

3. Another objective of this invention is that it use little or no additional power or energy.

4. Another objective of this invention is that it is easy to use even intuitive that requires little additional training.

5. Another objective of this invention is that the system of this invention is that it be water proof suitable for shop/factory floor environment.

6. Another objective of this invention is that it be physically safe in normal environment as well as accidental situations.

7. Another objective of this invention is that it be environmentally friendly.

8. Another objective of this invention is that it be made of modular units easily interface-able to each other.

9. Another objective of this invention is that it meet all federal, state, local and other private standards, guidelines and recommendations with respect to safety, environment, quality and energy consumption.

10. Another objective of this invention is that it be suitable for users of all ages, gender, cultures, nations and races etc.

11. Another objective of this invention is that it be elegantly simple in concept and design.

12. Another objective of this invention is that it be used by handicapped as well as people who are not professional touch typists and use hunt and peck one or two finger typing technique.

13. Another objective of this invention is that it be easy to assemble, service, transport and store.

14. Another objective of this invention is that it be useable in all types of locations including home, schools, work etc.

15. Another objective of this invention is that it can be used without removing the gloves in cold environment without any degradation in speed, quality or performance.

16. Another objective of this invention is that the keyboard and the underlying concept can be adapted for other uses.

17. Another objective of this invention is that it be ergonomic, colorful and aesthetic.

18. Another objective of this invention is that the device of this invention be plug compatible with the electronic digital computers of the prior art.

19. Another objective of this invention is that the mouse integrated keyboard of this invention have normal touch and feel with tactile feedback on the keys.

20. Anther objective of this invention is that it be user friendly and computer transparent.

21. Another objective of this invention is that the arrow keys of the keyboard can be used to emulate the pointing function at any vector at any speed including precise adjustment pixel by pixel.

22. Another objective of this invention is that the mouse mode key be back lit such that its status is constantly and instantly known to the operator at all times.

Other objectives of this invention reside in its simplicity, elegance of design, ease of manufacture, service and use and even aesthetics as will become apparent from the following brief description of the drawings and concomitant description.

Figure 2:
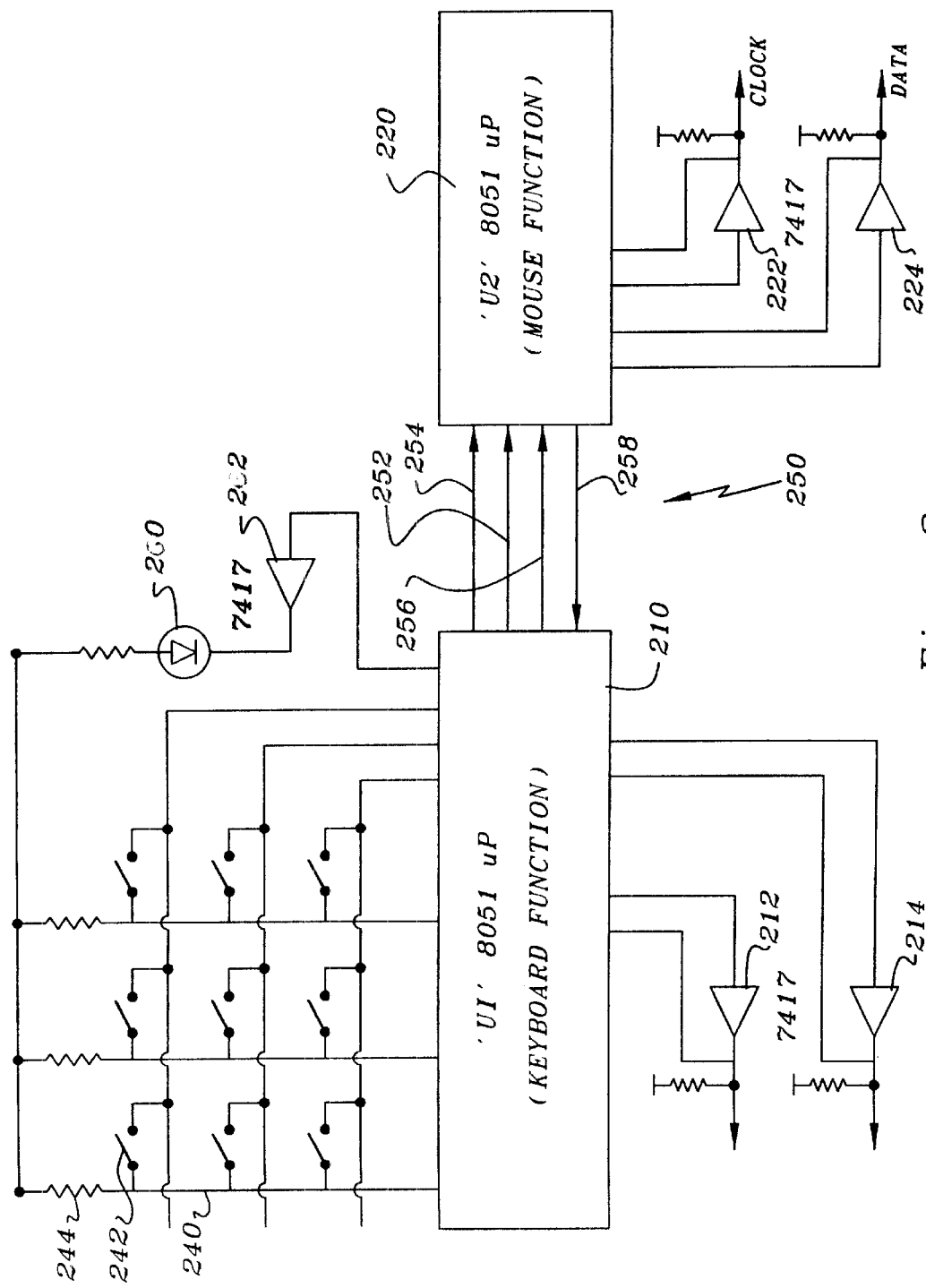
Figure 4:
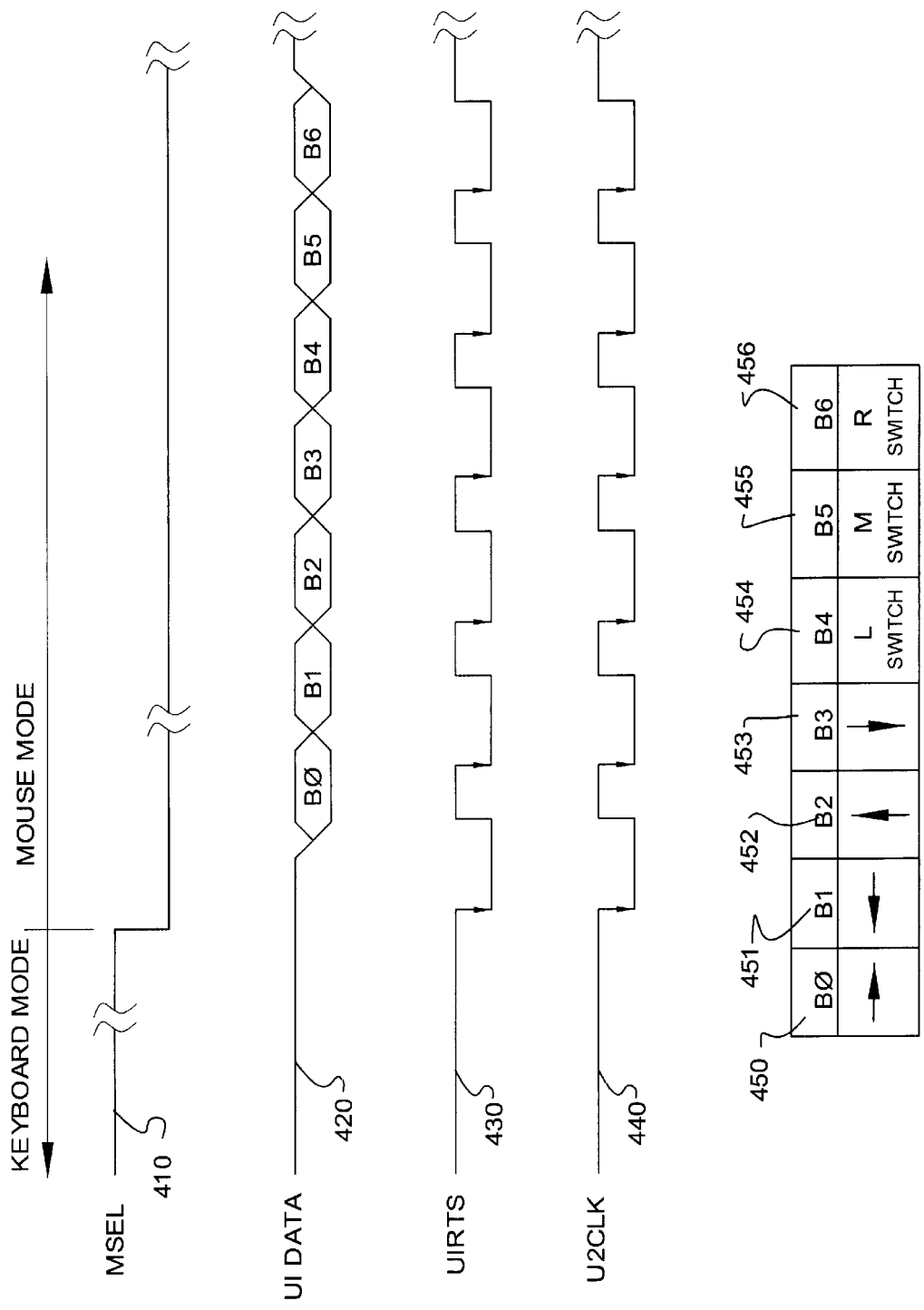
Figure 5:
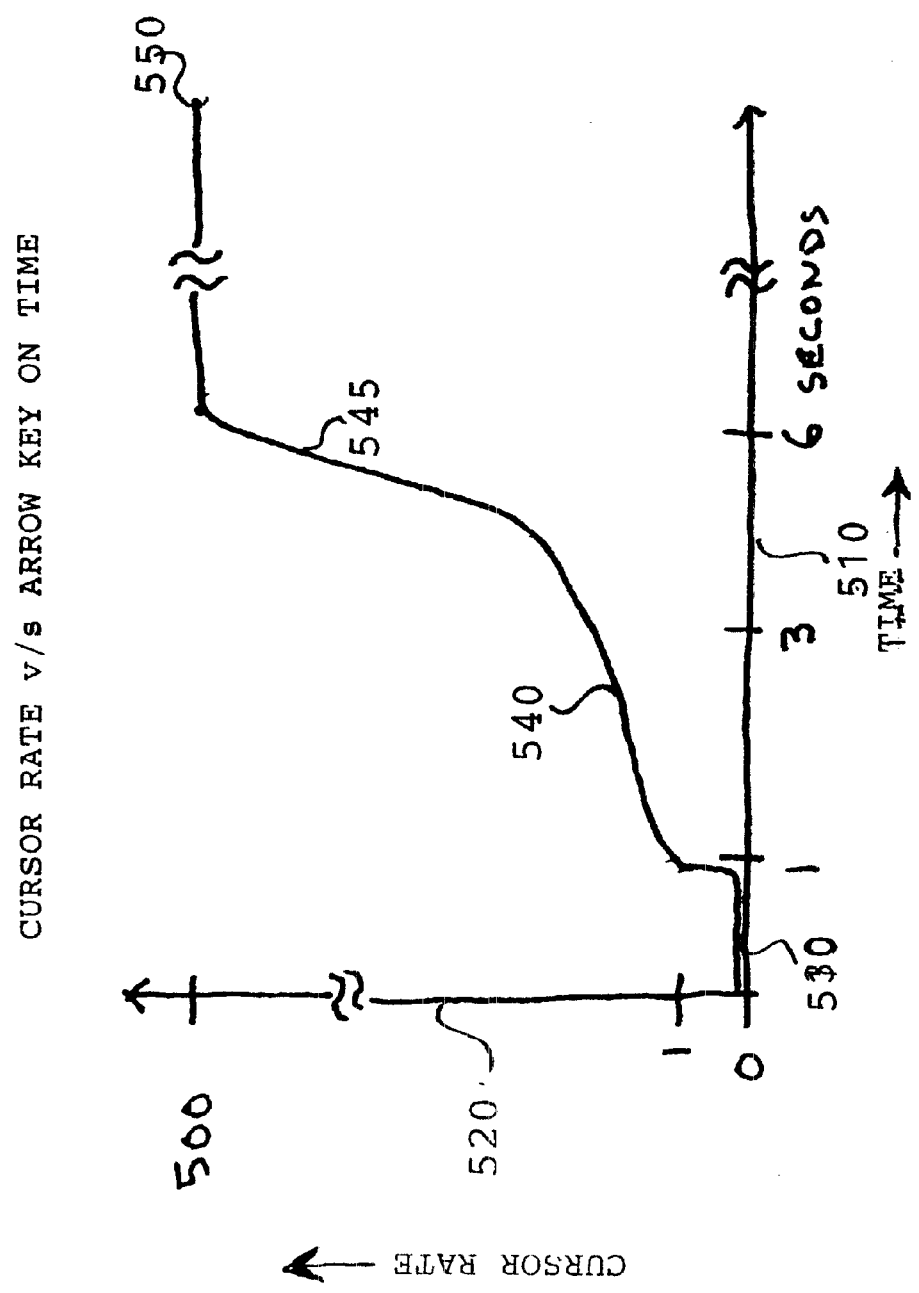

BRIEF DESCRIPTION OF THE DRAWINGS a) FIG. 1 is a plan view of the keyboard layout complete with silicone rubber waterproof cover and mouse key, modified arrow-keys, modified control, windows(R) and Alternate keys and a second key to provide for a second row of function keys.

b) FIG. 2 is a circuit diagram showing the keyboard switch matrix, a keyboard microprocessor and a mouse function microprocessor (which may be combined into a single microprocessor) as well as separate interfaces to keyboard port and mouse port of the computer.

c) FIG. 3(*a*) is a microprocessor 1 firmware flow chart. and FIG. 3(*b*) is a microprocessor 2 firmware flow chart.

d) FIG. 4 is a timing diagram with traces for keyboard/mouse mode status, microprocessor 1 data, Microprocessor 1 RTS and microprocessor 2 clock. Also included in the figure is the legend for the bit status assignments.

e) FIG. 5 is a graph of cursor rate along Y axis against arrow key depressed time along x axis.

DETAILED DESCRIPTION OF THE PREFERRED EMBODIMENT

The mouse emulation keyboard system of this invention as shown in the various drawings wherein like numerals represent like parts throughout the several views, there is generally disclosed in FIG. 1 is a plan view of the keyboard 100 layout complete with silicone rubber waterproof cover and mouse mode key 160, modified arrow-keys (151–154) modified control/mouse left 154, modified windows/mouse middle 155, and Alternate or mouse right key 156 and a second key 130 to provide for a second row of function keys. Following is a list of new or modified QWERTY keys.

01. Second Key/flag for dual function keys (130)
02. Dual function key F10 & F1 (131)
03. Dual function key F11 & F2 (132)
04. Dual function key F12 & F3 (133)
05. Dual function key Insert & F4 (134)
06. Back Lit Dual function key Number Lock & F5 (135)
07. Back Lit Dual function key scroll lock & F6 (136)
08. Dual function key Print Screen & F7 (137)
09. Dual function key Pause & F8 (138)
10. Dual function key Break & F9 (139)
11. Dual function key Big/Middle Brackets (141)
12. Dual function key tilde & hyphen (142)
13. Dual function key Quotes & Colon (143)
14. Dual function key period & greater than symbol (144)
15. Dual function key forward/back slash (145)
16. Dual function key End & Mouse/arrow right (150)
17. Dual function key Home & mouse/arrow left (151)
18. Dual function key Page Up & Mouse/arrow up (152)
19. Dual function key Page Down & mouse/arrow down (153)
20. Dual function key Control & left mouse button (154)
21. Dual function key Windows & middle mouse button (155)
22. Dual function key ALT & right mouse button (156)
23. Back lit mouse key with mouse icon (160)

To easily ascertain their status the following 4 keys are back lit.
a) CAPS Lock.
b) Dual function key Number Lock & F5 (135)
c) Dual function key scroll lock & F6 (136)
d) Mouse key with mouse icon (160)

FIG. 2 is a circuit diagram showing the keyboard switch matrix, a keyboard microprocessor 210 and a mouse function microprocessor 220 (which may be combined into a single microprocessor with associated integrated firmware for both keyboard and mouse) as well as separate interfaces to keyboard port and mouse port of the computer.

The modified keyboard 100 of this invention employs a typical QWERTY layout and switch matrix. FIG. 2 shows only a portion of the switch matrix 240. Each key has associated with it a dedicated SPST (single pole single throw) switch 242 and a resistor 244 to logic voltage level. The switch matrix 240 is controlled by two microprocessors 210, 220 on a printed circuit board.

The keyboard microprocessor 210 is connected to the keyboard port of the computer. The clock signals are interfaced via operational amplifier 212 and data signals via open collector non-inverting gate/buffer 214. Likewise the mouse microprocessor 220 is connected to the mouse port of the computer. The clock signals are interfaced via an operational amplifier/inventer 222 and the data signals via operational amplifier inventer 224. All communications between mouse microprocessor 220 and the mouse port of the computer use standard mouse protocols such that the computer thinks a mouse is connected to it even though no mouse is present.

The interface 250 between microprocessor 210 and 220 comprises mouse select signal 252, Request to Send signal 254 data signal 256 all from keyboard microprocessor 210 to mouse microprocessor 220 and clock signal 258 in the reverse direction from mouse microprocessor 220 to keyboard microprocessor 210.

In the preferred embodiment the inventor incorporated a back lit mouse mode key visible through the silicone rubber cover and utilized the cursor arrow keys for emulating the mouse function and left, middle, right mouse switch keys but a different permutation or combination of these keys will work just as well without deviating from the spirit of this invention. In the best mode embodiment the inventor used microprocessors 8051 and 7417, open collector non-inverting gate/buffer but other compatible equivalent components would work just as well.

Keyboard Operation

During the keyboard mode all normal keyboard keys are scanned but during the mouse mode only 8 mouse keys are scanned.

Figure 3A:
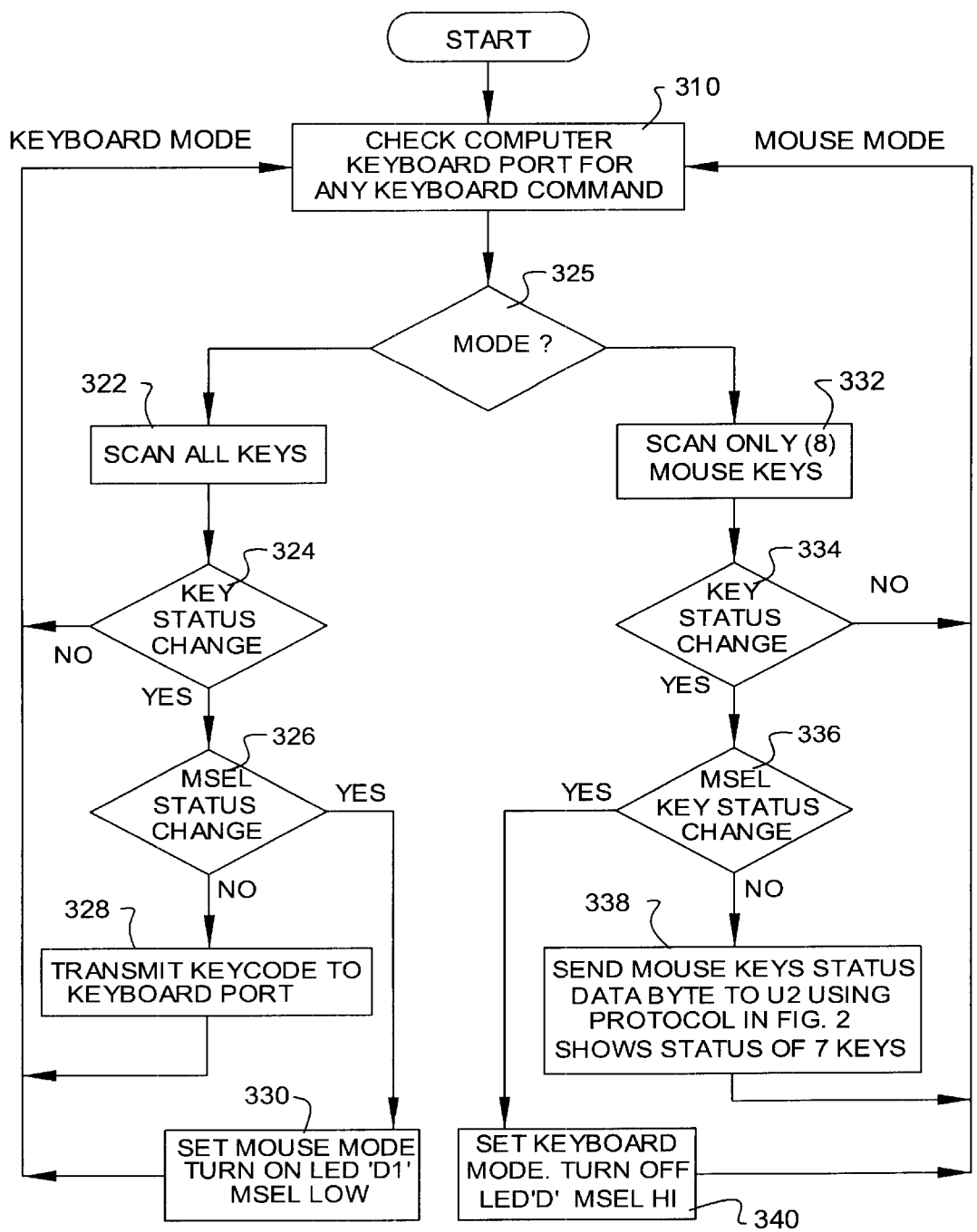

FIG. 3(a) is a microprocessor 1 firmware flow chart. The keyboard microprocessor 210 in the operational step 310 scans the key matrix 240 for any key operations and monitors the keyboard port for any commands from the computer and responds using appropriate keyboard protocol.

The decision block 325 decides whether the keyboard 100 is in the keyboard mode or the mouse mode. By default at power on the keyboard 100 is in the keyboard mode and the light emitting diode 260 is OFF.

The microprocessor 210 continues to scan all keys and transmit key-codes for any activated keys to the computer keyboard port.

The only exception is the mouse mode select key 160 with mouse icon, which is used by the user to select or deselect the mouse mode.

The keyboard mode utilizes scan operation 322, key status change decision block 324, mouse select key status change decision block 326, key-code transmission operation 328 and then uses the operation block 330 to turn off the keyboard mode & turn on the mouse mode indicator LED 260.

Thus the firmware flow-chart for detecting and switching to mouse mode is also housed in keyboard microprocessor 210, which utilizes eight key scan operation 332, key status change decision block 334, mouse select key status change decision block 336, and transmission block 328 for sending mouse key data byte to microprocessor 220.

Upon detection of mouse select key status change the operational block 340 turns off the light emitting diode 260 and the normal keyboard operation begins once again.

When the user depresses the mouse mode key 160 Microprocessor 210 turns on the light emitting diode 260 and starts to scan only the 8 mouse keys.

Mouse Operation

The mouse microprocessor 220 constantly monitors the mouse port signals for any commands from the computer and responds appropriately according to the desired or prescribed standard protocol. This mouse microprocessor 220 also monitors the status of logic signal line 250 that flow from keyboard microprocessor 210 to mouse microprocessor 220 viz mouse select signal 252, Request to Send signal 254 and data signal 256. The mouse microprocessor 220 controls the status of the clock signal 258 according to the timing protocol of FIG. 4.

Figure 3B:
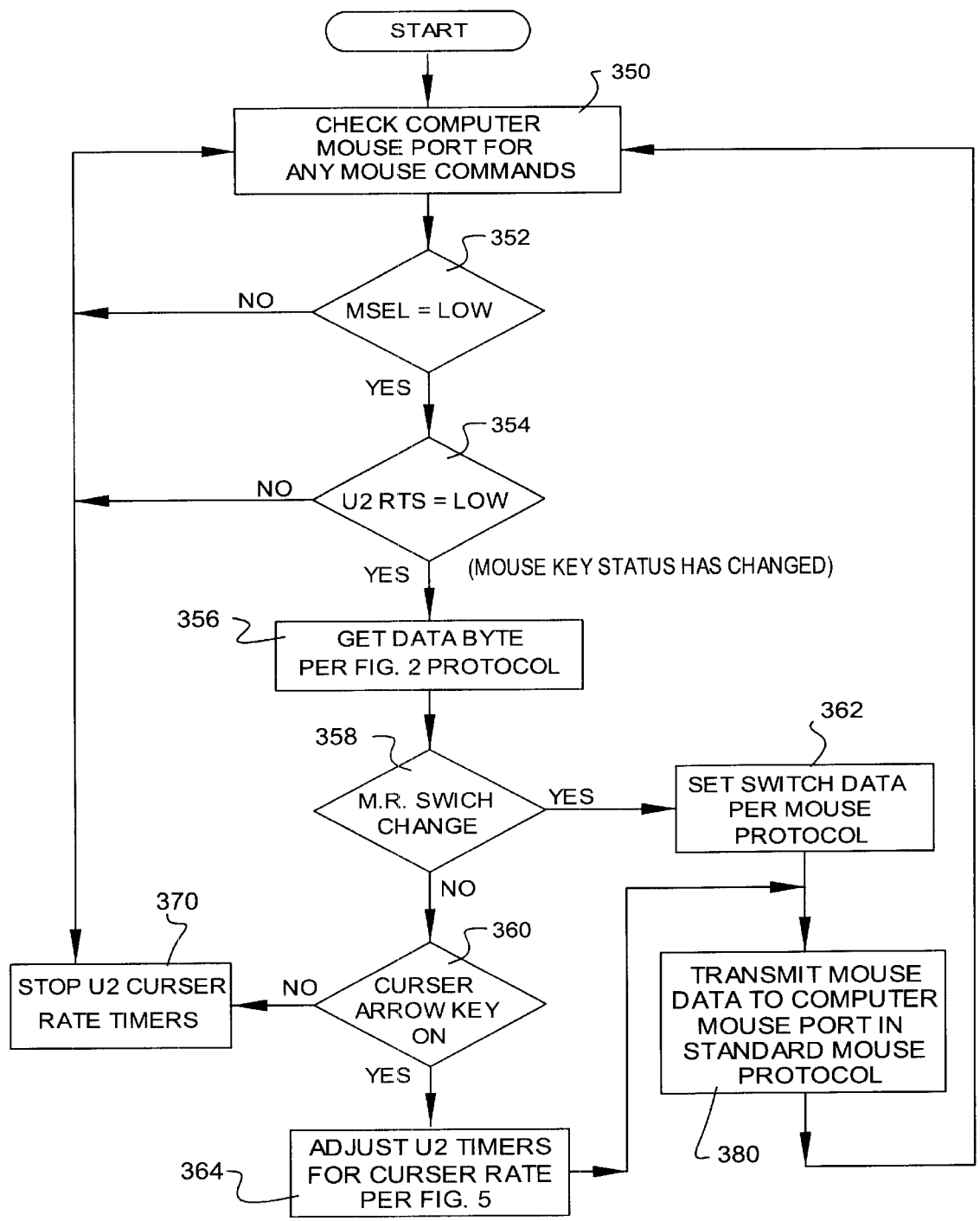

FIG. 3(b) is a microprocessor 2 firmware flow chart which shows the emulation of mouse from the keyboard. While normal operation takes place in the keyboard mode, in the mouse mode only 8 keys are scanned. Pressing the mouse mode switch 160 switches the system between keyboard mode and mouse mode. When the keyboard 100 is in the mouse mode, then mouse mode switch is lit. The following 8 keys are scanned during the mouse mode.

1. Dual function End and Mouse/arrow right key (150)
2. Dual function Home and mouse/arrow left key (151)
3. Dual function Page Up and Mouse/arrow up key (152)
4. Dual function Page Down & mouse/arrow down key (153)
5. Dual function CONtrol and left mouse button key (154)
6. Dual function Windows (with windows icon) & middle mouse button key (155)
7. Dual function ALTernate & right mouse button key (156)
8. Back lit mouse key with mouse icon (160)

The operation block 350 in mouse microprocessor 220 monitors computer mouse port for any mouse commands. The decision block 352 detects for mouse select signal and decision block 354 detects for Request to Send signal 254.

The operational block 356 fetches-data byte keyboard microprocessor 210 according to protocol timing diagram of FIG. 4.

The decision block 358 detects for emulated mouse button changes for left button 154, middle button 155 and right button 156 emulated on CONtrol, Windows with Icon and ALTernate keys respectively. These changes are transmitted immediately to the mouse port.

If an arrow key is pressed and released, the mouse microprocessor 220 transmits the mouse protocol for one pixel cursor movement in the prescribed appropriate direction. If two keys are pressed simultaneously diagonal movement results.

If an arrow key is held for more than one second then the mouse microprocessor 220 transmits cursor movement information at a rate of one pixel per second which is increased to a pre-determined maximum rate dependent on how long the key(s) is/are depressed according to the typical protocol shown in FIG. 5.

When any of these button changes are detected the block 362 sets data per mouse protocol for transmission by block 380 to the computer mouse port. If no changes are detected then decision block 360 continues to detect cursor arrow keys viz right 150, left 151, top 152 and down 153 housed with End, Home, Page Up and Page Down respectively. If arrow key movements are detected then the operational block 364 adjusts the mouse microprocessor 2 timers according to the pixel speed protocol of FIG. 5. On the other hand if no movement of arrow keys is detected then the timers are halted.

FIG. 4 is a timing diagram with traces for keyboard/mouse mode status trace 410, keyboard microprocessor data trace 420, keyboard microprocessor trace 430 for Request to Send Signal 254 and mouse microprocessor clock trace 440. Also included in the figure is the legend for the bit status assignments as follows.

a) Bit 0—Right arrow key signal status 450
b) Bit 1—Left arrow key signal status 451
c) Bit 2—Up arrow key signal status 452
d) Bit 3—Down arrow key signal status 453
e) Bit 4—Mouse left button status 454
f) Bit 5—Mouse middle button status 455
g) Bit 6—Mouse right button status 456

FIG. 5 is a graph of cursor rate along Y axis 520 against arrow key depressed time along x axis 510. Trace 530 covers duration of up to one second approx. Trace 540 defines speed for time durations of key depressions from 1 to 4 seconds. The trace 545 shows the speed form three to six seconds and finally trace 550 shows the constant leveled off speed. The purpose of the speed changes is to facilitate optimum mix of precision and speed of cursor movement emulation.

Ease of Use

The use of the mouse emulation keyboard system of this invention is simple and even intuitive. Nonetheless the inventor recommends the following steps.

a) Remove the prior art keyboard and mouse.
b) Plug the keyboard of this invention into the keyboard port and the mouse port using the bifurcated cable.
c) Use the keyboard normally for keyboard functions when the mouse key is inactive.
d) Activate the mouse key and the arrow keys can now be used as mouse key to move the pointing device horizontally or vertically.
e) To move the pointing device diagonally corresponding pair of vertical and horizontal keys are used.
f) To move the pointing device cursor at high speed the keys are depressed continuously.
g) To finely adjust the position of the pointed precisely the keys can be used as momentary push-button keys to move the cursor pixel by pixel.
h) To activate the mouse button functions, depress the appropriate corresponding switch key at the lower left of the keyboard. More specifically Control for left, windows for middle and Alternate for right mouse buttons.

The inventor has given a non-limiting description of this invention. Due to the simplicity and elegance of the design of this invention designing around it is very difficult if not impossible. Nonetheless many changes may be made to this design without deviating from the spirit of this invention. Examples of such contemplated variations include the following:

1. The shape and size of the various members and components may be modified.
2. Instead of the separate microprocessors a single microprocessor may be utilized.
3. Additional complimentary and complementary functions and features may be added.
4. Instead of the silicone rubber cover a different means may be utilized for making it water proof.
5. A different type of cable may be used.
6. PS/2 computer style mouse interface could be other type such as serial etc.
8. Keyboard interface to the keyboard port may be modified.
9. Standard protocols may be modified for specific needs.

Other changes such as aesthetics and substitution of newer materials as they become available, which substantially perform the same function in substantially the same manner with substantially the same result without deviating from the spirit of the invention may be made.

Following is a listing of the components used in this embodiment arranged in ascending order of the reference numerals for ready reference of the reader.

100=Mouse Emulation Keyboard generally
110=Silicone Rubber waterproof cover
120=QWERTY keyboard keys
130=2nd Key/flag for dual function keys
131=Dual function key F1 and F10
132=Dual function key F2 and F11
133=Dual function key F3 and F12
134=Dual function key F4 and Insert
135=Dual function key F5 and Number Lock (Back Lit)
136=Dual function key F6 and scroll lock (Back Lit)
137=Dual function key F7 and Print Screen
138=Dual function key F8 and Pause
139=Dual function key F9 and Break
141=Dual function key middle and big brackets
142=Dual function key tilde and underline
143=Dual function key single quotes and semi-colon
144=Dual function key & period or greater & less than symbols
145=Dual function key forward and back slash
150=Dual function key mouse arrow right and End
151=Dual function key mouse arrow right and Home
152=Dual function key mouse arrow up and Page Up
153=Dual function key mouse arrow down and Page Down
154=Dual function key left mouse button and Control
155=Dual function key middle mouse button and Windows
156=Dual function key mouse right button and Alternate
160=Mouse key status with mouse icon (Back Lit)
200=Keyboard electronics
210=Keyboard processor-1
212=1st Operational Amplifier for keyboard port clock interface
214=2nd OP AMP for keyboard port data interface
220=Mouse processor-2

222=1st Operational amplifier for mouse port clock interface
224=2nd Op Amp for mouse port data interface
235=Back Lit Number Lock dual function key
236=Back lit scroll lock key
240=Keyboard key switch matrix
242=Keyboard SPST switches
244=Resistor in keyboard electronics
250=Inter-microprocessor interface
252=Mouse selection signal from 1 to 2
254=Microprocessor 1 for keyboard RTS from P1 to P2
256=Microprocessor 1 for keyboard data P1 to P2
258=Microprocessor 2 clock for mouse from 2 to 1
260=Light emitting diode for mouse mode key
262=Open collector non-inverting gate or buffer
301=Keyboard microprocessor 1 firmware flow-chart
302=Mouse microprocessor 2 firmware flow-chart
310=Keyboard port scan for commands operation
322=Scan of all keys
324=Key status change decision block
325=Keyboard/mouse mode select decision block
326=Mouse select decision block
328=Transmission of key-code to keyboard port
330=Set mouse mode and activate corresponding LED
332=Scan of 8 mouse keys
334=Key status change decision block
336=Mouse select decision block
338=Transmission of data byte to 2nd microprocessor consisting of status of 7 keys
340=Reset to keyboard mode and turn off concomitant back lit light emitting diode
350=Mouse port scan for commands operation
352=Mouse select decision block
354=Mouse (microprocessor 2) decision block
356=Fetch data byte operation
358=L.M.R. switch change decision block
360=Cursor arrow key decision block
364=Adjustment of mouse (microprocessor 2) timers for cursor rate
370=Resetting of mouse (microprocessor 2) timers
380=Transmission of mouse data to computer mouse port in standard mouse protocol
400=Timing diagram
410=Mouse select trace
420=Keyboard (microprocessor 1) data trace
430=Keyboard (microprocessor 1) RTS trace
440=Mouse (microprocessor 2) clock trace
450=Bit 0—Right arrow key signal status
451 Bit 1—Left arrow key signal status
452=Bit 2—Up arrow key signal status
453=Bit 3—Down arrow key signal status
454=Bit 4—Mouse left button status
455=Bit 5—Mouse middle button status
456=Bit 6—Mouse right button status
500=Cursor rate plot against arrow key depressed time
510=Time along X-axis
520=Cursor pixel rate per second along Y axis
530=Rate for one second or less of time
540=Rate from 1–4 seconds approx
545=Accelerated rate 5–6 seconds
550=Rate saturation at 6 seconds

DEFINITIONS AND ACRONYMS

A great care has been taken to use words with their conventional dictionary definitions. Following definitions are included here for clarification.

3D=Three Dimensional
DIY=Do It Yourself
Integrated=Combination of two entities to act like one
Interface=Junction between two dissimilar entities
Keyboard=An alpha-numeric data entry device from an operator(s) to computer(s)
LED=Light Emitting Diode
Mouse=A pointing device used with computers
Pixel=Smallest/finest resolution increment on a computer display.
QWERTY=Keyboard lay out
RTS=Request to send
SPST=Single pole single throw switch
Symmetrical=The shape of an object of integrated entity which can be divided into two along some axis through the object or the integrated entity such that the two halves form mirror image of each other.

While this invention has been described with reference to illustrative embodiments, this description is not intended to be construed in a limiting sense. Various modifications and combinations of the illustrative embodiments as well as other embodiments of the invention will be apparent to a person of average skill in the art upon reference to this description. It is therefor contemplated that the appended claim(s) cover any such modifications, embodiments as fall within the true scope of this invention.

What is claimed is:

1. An integrated mouse emulation keyboard system for use with an electronic digital computer on a shop floor comprising:
    a) a bifurcated plug connected to the keyboard;
    b) means for emulating arrow keys on said keyboard;
    c) wherein control, windows and alternate keys have dual functionality; and
    d) wherein said bifurcated plug is connected to a mouse port and a keyboard port of the computer connected to said keyboard system.

2. The integrated mouse emulation keyboard system of claim 1 wherein following keys are backlit;
    a) CAPS Lock;
    b) Dual function key Number Lock & F5;
    c) Dual function key Scroll Lock & F6; and
    d) Mouse key with mouse icon.

3. A process of integrating a pointing device into a keyboard for alphanumeric data entry into a computer from a single device comprising the steps of:
    a) adding the following dual function keys to said keyboard:
        (i) Second Key/flag for dual function keys;
        (ii) Dual function key F10 & F1;
        (iii) Dual function key F11 & F2;
        (iv) Dual function key F12 & F3;
        (vi) Dual function key Insert & F4;

(vii) Back Lit Dual function key Number Lock & F5;
(viii) Back Lit Dual function key scroll lock & F6;
(ix) Dual function key Print Screen & F7;
(x) Dual function key Pause & F8;
(xi) Dual function key Break & F9;
(xii) Dual function key Big/Middle Brackets;
(xiii) Dual function key tilde & hyphen;
(xiv) Dual function key Quotes & Colon;
(xv) Dual function key period & greater than symbol;
(xvi) Dual function key forward/back slash;
(xvii) Dual function key End & Mouse/arrow right;
(xvii) Dual function key Home & mouse/arrow left;
(xix) Dual function key Page Up & Mouse/arrow up;
(xx) Dual function key Page Down & mouse/arrow down;
(xxi) Dual function key Control & left mouse button;
(xxii) Dual function key Windows & middle mouse button;
(xxi) Dual function key ALT & right mouse button;
(xxiv) Back lit mouse key with mouse icon; and b) connecting a bifurcated plug to a mouse port and a keyboard port of the computer connected to said keyboard.

\* \* \* \* \*